United States Patent
Koskinen et al.

(10) Patent No.: US 9,445,330 B2
(45) Date of Patent: Sep. 13, 2016

(54) PRE-CONFIGURED REDIRECTION INFORMATION

(75) Inventors: Jussi-Pekka Koskinen, Oulu (FI); Jarkko T. Koskela, Oulu (FI); Lars Dalsgaard, Oulu (FI); Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 14/116,982

(22) PCT Filed: May 3, 2012

(86) PCT No.: PCT/FI2012/050429
§ 371 (c)(1),
(2), (4) Date: Nov. 11, 2013

(87) PCT Pub. No.: WO2012/160246
PCT Pub. Date: Nov. 29, 2012

(65) Prior Publication Data
US 2014/0078885 A1    Mar. 20, 2014

Related U.S. Application Data

(60) Provisional application No. 61/488,327, filed on May 20, 2011.

(51) Int. Cl.
*H04W 36/16*    (2009.01)
*H04W 36/30*    (2009.01)
(Continued)

(52) U.S. Cl.
CPC ....... *H04W 36/165* (2013.01); *H04W 36/0061* (2013.01); *H04W 36/30* (2013.01); *H04W 36/0083* (2013.01); *H04W 36/08* (2013.01); *H04W 76/028* (2013.01)

(58) Field of Classification Search
USPC .......................................................... 370/216
See application file for complete search history.

(56) References Cited

U.S. PATENT DOCUMENTS

2007/0249353 A1* 10/2007 Kang ................ H04W 36/0055
                                                           455/436
2010/0234026 A1*  9/2010 Tenny ............... H04W 36/0061
                                                           455/436
(Continued)

FOREIGN PATENT DOCUMENTS

EP        2026610 A1     2/2009
EP        2068572 A1     6/2009
(Continued)

OTHER PUBLICATIONS

International Search Report and Written Opinion received for corresponding Patent Cooperation Treaty Application No. PCT/FI2012/050429, dated Aug. 7, 2012, 15 pages.
(Continued)

*Primary Examiner* — Charles C Jiang
*Assistant Examiner* — Kyaw Z Soe
(74) *Attorney, Agent, or Firm* — Harrington & Smith

(57) ABSTRACT

A method includes receiving information to be used in response to failure, while a UE is in a connected state with a network, of a network connection between the user equipment and a current cell. The received information is to be used by the UE to search for another cell to reestablish the network connection. In response to the failure, searching, based on the received information, for another cell to reestablish the network connection. Another method includes determining, in a network, information to be used by a UE in response to failure of a network connection between the UE and a current cell. The information is to be used by the UE in response to the failure occurring while the UE is in a connected state with the network and to be used to search for another cell to reestablish the network connection. Apparatus and program products are disclosed.

17 Claims, 7 Drawing Sheets

(51) Int. Cl.
*H04W 36/00* (2009.01)
*H04W 36/08* (2009.01)
*H04W 76/02* (2009.01)

(56) References Cited

U.S. PATENT DOCUMENTS

| | | | |
|---|---|---|---|
| 2011/0250892 A1 | 10/2011 | Gupta et al. | |
| 2011/0269464 A1* | 11/2011 | Xu | H04W 36/0033 455/436 |
| 2012/0020231 A1* | 1/2012 | Chen | H04W 36/08 370/252 |
| 2013/0183977 A1* | 7/2013 | Han | H04W 36/0055 455/436 |
| 2013/0210434 A1* | 8/2013 | Dimou | H04W 36/0083 455/436 |

FOREIGN PATENT DOCUMENTS

| | | | |
|---|---|---|---|
| WO | 2005025092 A1 | 3/2005 | |
| WO | 2011/120967 A1 | 10/2011 | |

OTHER PUBLICATIONS

"3rd Generation Partnership Project; Technical Specification Group Radio Access Network; Evolved Universal Terrestrial Radio Access (E-UTRA); Requirements for support of radio resource management (Release 10)", 3GPP TS 36.133, V10.1.0, Dec. 2010, 402 pages.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304, V10.1.0, Mar. 2011, 33 pages.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.0.0, Dec. 2010, 276 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.11.0, Dec. 2009, 148 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, V10.2.0, Dec. 2012, 200 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, V10.3.0, Mar. 2011, 197 pages.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913, V9.0.0, Dec. 2009, 15 pages.

"3rd Generation Partnership Project; Technical Specification Group Radio Access Network; Feasibility study for Further Advancements for E-UTRA (LTE-Advanced) (Release 9)", 3GPP TR 36.912, V9.3.0, Jun. 2010, 61 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321, V10.1.0, Mar. 2011, 53 pages.

Extended European Search Report received for corresponding European Patent Application No. 12789467.3, dated Mar. 31, 2015, 7 pages.

"Mobility In LTE_ACTIVE State", 3GPP TSG RAN WG2#58bis, R2-072823, Agenda Item: 4.5.1, Vodafone Group, Jun. 25-29, 2007, 6 pages.

"Radio Link Failure Recovery", 3GPP TSG-RAN WG2 Meeting #58, R2-072382, Agenda item: 4.5.1, Nokia Siemens Networks, Jun. 25-29, 2007, 8 pages.

IEEE Standard for Local and metropolitan area networks Part 16: Air Interface for Broadband Wireless Access Systems; IEEE Computer Society and the IEEE Microwave Theory and Techniques Society; IEEE Std 802.16™-2009 (Revision of IEEE Std 802.16-2004), May 29, 2009 (1080 pages).

IEEE Standard for Local and metropolitan area networks Part 16: Air Interface for Broadband Wireless Access Systems; IEEE Computer Society and the IEEE Microwave Theory and Techniques Society; IEEE Std 802.16™-2009 (Revision of IEEE Std 802.16-2004), May 29, 2009 (2082 pages).

* cited by examiner

| Step | Procedure | Message Sequence | |
|---|---|---|---|
| | | UE – BS | Message |
| 1 | The UE is in RRC_CONNECTED state on the Cell 1. | - | - |
| 2 | The UE context is available in Cell 3, but the UE context is not available in Cell 2. | - | - |
| 3 | Cell 2 and Cell 3 are available with sufficient RSRP levels. The RSRP level of Cell 2 is better than the RSRP level of Cell 3. | - | - |
| 4 | RSRP of Cell 1 suddenly goes bad and radio link failure occurs. | - | - |
| 5 | The UE starts cell selection procedure. | - | - |
| 6 | The UE detects Cell 2 and starts re-establishment procedure. | -> (UL) | *RRCConnectionReestablishmentRequest* |
| 7 | The NW sends *RRCConnectionReestablishmentReject* because the UE context is not available in Cell 2. | <-(DL) | *RRCConnectionReestablishmentReject* |
| 8 | The UE goes to RRC_IDLE. | | |

FIG. 2

| Step | Procedure | Message Sequence | |
|---|---|---|---|
| | | UE – BS | Message |
| 1 | The UE is in RRC_CONNECTED state on Cell 1. | - | - |
| 2 | The network includes redirection information. Information regarding Cell 3 is present in the redirection information. | <-- (DL) | *RRCConnectionReconfiguration (includes PreConfiguredRedirectInfo)* |
| 3 | The UE confirms that the redirection information is taken into use. | --> (UL) | *RRCConnectionReconfigurationComplete* |
| 4 | Cell 2 and Cell 3 are available with sufficient RSRP levels. RSRP level of Cell 2 is better than RSRP level of Cell 3. | - | - |
| 5 | RSRP level of Cell 1 suddenly goes bad and radio link failure occurs. | - | - |

FIG. 4

| Step | Procedure | Message Sequence | |
|---|---|---|---|
| | | UE - BS | Message |
| 6 | The UE starts a cell selection procedure and the UE searches Cell 3 first according to the redirection information. | - | - |
| 7 | The UE detects Cell 3 and starts a re-establishment procedure even if Cell 2 would have been heard as well. Cell 3 should also fulfill cell suitability criteria. | --> (UL) | *RRCConnectionReestablishmentRequest* |
| 8 | The NW transmits *RRCConnectionReestablishment* message. | <-- (DL) | *RRCConnectionReestablishment* |
| 9 | The UE transmits *RRCConnectionReestablishmentComplete* message. | --> (UL) | *RRCConnectionReestablishmentComplete* |
| 10 | Connection is re-established and normal operation continues. | | |

FIG. 4 (Continued)

PRE-CONFIGURED REDIRECTION INFORMATION

RELATED APPLICATION

This application was originally filed as Patent Cooperation Treaty Application No. PCT/FI2012/050429 filed May 3, 2012 which claims priority benefit to U.S. Provisional Patent Application No. 61/488,327, filed May 20, 2011.

TECHNICAL FIELD

This invention relates generally to radio frequency communications and, more specifically, relates to cell selection for UEs.

BACKGROUND

This section is intended to provide a background or context to the invention disclosed below. The description herein may include concepts that could be pursued, but are not necessarily ones that have been previously conceived, implemented or described. Therefore, unless otherwise indicated herein, what is described in this section is not prior art to the description in this application and is not admitted to be prior art by inclusion in this section.

The following abbreviations that may be found in the specification and/or the drawing figures are defined as follows:

3GPP third generation partnership project
BS base station
DL downlink, from base station to user equipment
ECGI enhanced cell global identity
EDGE enhanced data rates for GSM evolution
eNB Node B (evolved Node B), E-UTRAN base station
EPC evolved packet core
E-UTRAN evolved UTRAN (LTE)
GERAN GSM EDGE radio access network
GSM global system for mobile communications
HO handover
LTE long term evolution of UTRAN (E-UTRAN)
LTE-A LTE advanced
MAC medium access control (layer 2, L2)
MM/MME mobility management/mobility management entity
NodeB Node B, UTRAN base station
NW network
O&M operations and maintenance
PCI physical cell identity
PDCP packet data convergence protocol
PHY physical (layer 1, L1)
RAT radio access technology
Rel release (e.g., Rel-10 is release 10)
RLF radio link failure
RNC radio network controller (UTRAN)
RSRP reference signal received power
RRC radio resource control
RRM radio resource management
TR technical report
TS technical standard
UE user equipment, such as a mobile station, mobile node or mobile terminal
UL uplink, from user equipment to base station
UTRAN universal terrestrial radio access network
X2 interface between eNBs (E-UTRAN)

One modern communication system is known as evolved UTRAN (E-UTRAN, also referred to as UTRAN-LTE or as E-UTRA). One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 and Release 10 versions of at least some of these specifications have been published including 3GPP TS 36.300, V10.2.0 (2010-12).

FIG. 1 reproduces FIG. 4-1 of 3GPP TS 36.300 and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW). The S1 interface supports a many-to-many relationship between MMEs/S-GWs/UPEs and eNBs.

The eNB hosts the following functions:

functions for RRM: RRC, Radio Admission Control, Connection Mobility Control, Dynamic allocation of resources to UEs in both UL and DL (scheduling);

IP header compression and encryption of the user data stream;

selection of a MME at UE attachment;

routing of User Plane data towards the EPC (MME/S-GW);

scheduling and transmission of paging messages (originated from the MME);

scheduling and transmission of broadcast information (originated from the MME or O&M); and a measurement and measurement reporting configuration for mobility and scheduling.

Of particular interest herein are the further releases of 3GPP LTE (e.g., LTE Rel-10, LTE Rel-11) targeted towards future IMT-A systems, referred to herein for convenience simply as LTE-Advanced (LTE-A). LTE-A is specified in Rel-10 (see, e.g., 3GPP TS 36.300 v10.3.0 (2011-03)), further enhancements in Rel-11. Reference in this regard may also be made to 3GPP TR 36.913 V9.0.0 (2009-12) Technical Report 3rd Generation Partnership Project; Technical Specification Group Radio Access Network; Requirements for further advancements for Evolved Universal Terrestrial Radio Access (E-UTRA) (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

In this system and other systems, a UE performs a cell selection procedure according to certain standards. Cell selection may occur, for instance, in UE power on situations, in connection with handover (HO) failure situations and in connection with Radio Link Failure (RLF) where a UE is leaving one cell and is entering another cell. Cell selection is left to UE implementation.

BRIEF SUMMARY

This section is illustrative and sets out examples of the invention.

In an exemplary embodiment, a method is disclosed that includes receiving information to be used in response to a failure, while a user equipment is in a connected state with a network, of a network connection between the user equipment and a current cell. The received information is to be used by the user equipment to search for another cell to reestablish the network connection. In response to the failure of the network connection to the current cell while the user equipment is in the connected state with the network, searching, based on the received information, for another cell to reestablish the network connection.

In another exemplary embodiment, a computer program is disclosed that includes code for performing receiving information to be used in response to a failure, while a user equipment is in a connected state with a network, of a network connection between the user equipment and a current cell, the received information to be used by the user equipment to search for another cell to reestablish the network connection; in response to the failure of the network connection to the current cell while the user equipment is in the connected state with the network, searching, based on the received information, for another cell to reestablish the network connection, when the computer program is run on a processor. Another example includes the computer program of this paragraph, wherein the computer program is a computer program product comprising a computer-readable memory medium bearing computer program code embodied therein for use with a computer.

In a further exemplary embodiment, an apparatus includes one or more processors and one or more memories including computer program code. The one or more memories and the computer program code configured, with the one or more processors, to cause the apparatus to perform at least the following: receiving information to be used in response to a failure, while a user equipment is in a connected state with a network, of a network connection between the user equipment and a current cell, the received information to be used by the user equipment to search for another cell to reestablish the network connection; and in response to the failure of the network connection to the current cell while the user equipment is in the connected state with the network, searching, based on the received information, for another cell to reestablish the network connection.

In an additional example, an apparatus includes means for receiving information to be used in response to a failure, while a user equipment is in a connected state with a network, of a network connection between the user equipment and a current cell, the received information to be used by the user equipment to search for another cell to reestablish the network connection; and means, responsive to the failure of the network connection to the current cell while the user equipment is in the connected state with the network, for searching, based on the received information, for another cell to reestablish the network connection.

In a further example, a method is disclosed that includes: determining, in a network, information to be used by a user equipment in response to a failure of a network connection between the user equipment and a current cell, the information to be used by the user equipment in response to the failure occurring while the user equipment is in a connected state with the network and to be used to search for another cell to reestablish the network connection; and transmitting the information from the network to the user equipment.

An additional exemplary embodiment includes a computer program comprising code for performing: determining, in a network, information to be used by a user equipment in response to a failure of a network connection between the user equipment and a current cell, the information to be used by the user equipment in response to the failure occurring while the user equipment is in a connected state with the network and to be used to search for another cell to reestablish the network connection; and transmitting the information from the network to the user equipment, when the computer program is run on a processor. Another example includes the computer program of this paragraph, wherein the computer program is a computer program product comprising a computer-readable memory medium bearing computer program code embodied therein for use with a computer.

A further exemplary embodiment is an apparatus that includes one or more processors and one or more memories including computer program code. The one or more memories and the computer program code configured, with the one or more processors, to cause the apparatus to perform at least the following: determining, in a network, information to be used by a user equipment in response to a failure of a network connection between the user equipment and a current cell, the information to be used by the user equipment in response to the failure occurring while the user equipment is in a connected state with the network and to be used to search for another cell to reestablish the network connection; and transmitting the information from the network to the user equipment.

In an additional exemplary embodiment, an apparatus is disclosed that includes means for determining, in a network, information to be used by a user equipment in response to a failure of a network connection between the user equipment and a current cell, the information to be used by the user equipment in response to the failure occurring while the user equipment is in a connected state with the network and to be used to search for another cell to reestablish the network connection; and means for transmitting the information from the network to the user equipment.

BRIEF DESCRIPTION OF THE DRAWINGS

In the attached Drawing Figures:

FIG. 2 is a table illustrating steps taken for an example of a failed RRC connection re-establishment.

FIG. 4 is a table illustrating steps taken for an example of improved cell selection for RRC connection re-establishment using dedicated signaling.

DETAILED DESCRIPTION OF THE DRAWINGS

Figure 1:
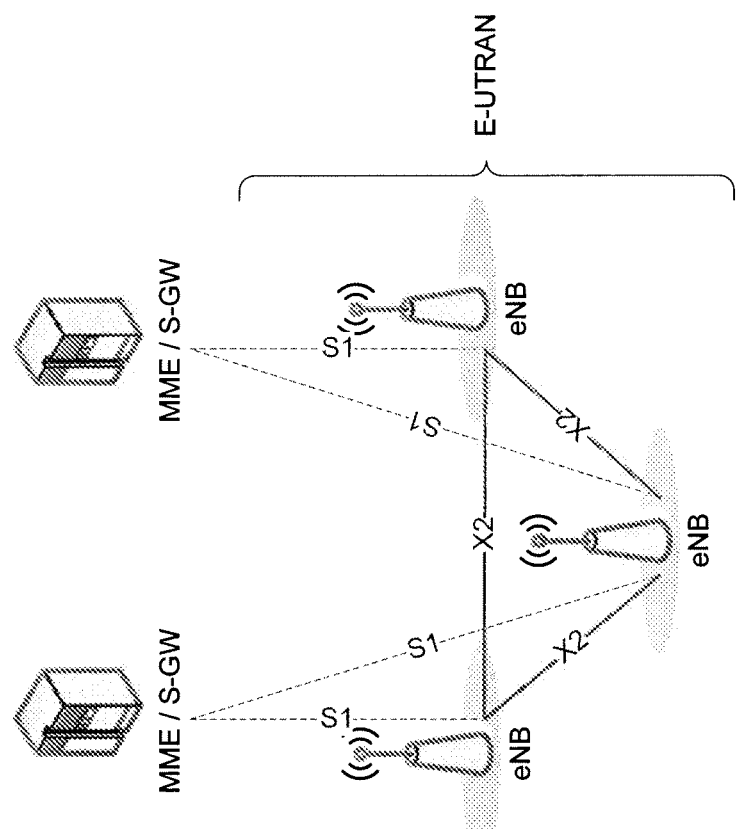
FIG. 1 reproduces FIG. 4-1 of 3GPP TS 36.300, and shows the overall architecture of the EUTRAN system.

As described above, the UE shall perform a cell selection procedure according to certain standards. This procedure is determined according to 3GPP TS 36.133 and 3GPP TS 36.304. Cell selection procedural details are left to UE implementation and only general performance requirements are specified for the selection. Requirements can be found from 3GPP TS 36.133 section 4.1, copied below for convenience.

4.1 Cell Selection

After a UE has switched on and a PLMN has been selected, the Cell selection process takes place, as described in TS 36.304. This process allows the UE to select a suitable cell where to camp on in order to access available services. In this process the UE can use stored information (Stored information cell selection) or not (Initial cell selection).

Requirements can be also found from 3GPP TS 36.304 section 5.2.3.1, which is repeated below for convenience:

5.2.3 Cell Selection process 5.2.3.1 Description

The UE shall use one of the following two cell selection procedures:

a) Initial Cell Selection

This procedure requires no prior knowledge of which RF channels are E-UTRA carriers. The UE shall scan all RF channels in the E-UTRA bands according to its capabilities to find a suitable cell. On each carrier frequency, the UE need only search for the strongest cell. Once a suitable cell is found this cell shall be selected.

b) Stored Information Cell Selection

This procedure requires stored information of carrier frequencies and optionally also information on cell parameters, from previously received measurement control information elements or from previously detected cells. Once the UE has found a suitable cell the UE shall select it. If no suitable cell is found the Initial Cell Selection procedure shall be started.

NOTE: Priorities between different frequencies or RATs provided to the UE by system information or dedicated signaling are not used in the cell selection process.

Basically, this means that at least the following factors are affecting cell selection time:

1) UE implementation dependent cell selection algorithms:
  a) Which system and/or RAT are/is searched first;
  b) Order of band and/or frequency search;
  c) Search based on possible stored information.
2) Supported bands and/or RATs.
3) Search performance.

A cell selection procedure is performed at least in the following scenarios:

1) Initial cell selection, i.e., after power-on of the UE;
2) Before RRC connection re-establishment; and
3) After leaving the RRC_CONNECTED state.

The cell selection procedure may take a long time under certain circumstances. Especially in cases involving user activity, long cell selection times might become a visible interrupt in service for the user. One example of this is in a case of RLF (e.g., loss of serving cell or HO failure) during a connected state of the UE (e.g., RRC_CONNECTED) and thus causing for example a dropped voice call. Especially, there could be a drop of service if the UE selects a cell where the UE context is not available. UE context includes, e.g., E-RAB (E-UTRAN radio access bearer) context, C-RNTI (cell radio network temporary identifier), security context, roaming restriction, UE capability information, subscriber profile ID (identification) for RAT/frequency priority, UE S1 signaling connection ID, etc., in the eNB to enable fast Idle-to-Active transition. See, e.g., 3GPP TS 36.300, section 19.2.1.3. Thus, an RRC re-establishment procedure will fail, and the UE will move to the RRC_IDLE state. Also impacting the service experience is the potential choice of another RAT, e.g., selecting a cell in GERAN although the service drop happened in E-UTRAN.

The following description will use E-UTRAN for the detailed discussion of a problem and describing potential solutions for the problem. The use of E-UTRAN should not be a limiting factor but merely a way to simplify the description.

An example of a failed RRC Connection re-establishment is shown in FIG. 2. In step 1, the UE is in the RRC_CONNECTED state on Cell 1. In step 2, the UE context is available in Cell 3, but the UE context is not available in Cell 2. In step 3, Cell 2 and Cell 3 are available with sufficient RSRP levels. However, the RSRP level of Cell 2 is better than the RSRP level of Cell 3. It should be noted that this is only one example of possible RSRP settings. In step 4, the RSRP level of Cell 1 suddenly goes bad (e.g., the RSRP level does not meet a predetermined criterion) and radio link failure (RLF) occurs. In step 5, the UE starts a cell selection procedure.

In step 6, the UE detects Cell 2 and starts a re-establishment procedure. This procedure includes sending from the UE to the BS (e.g., eNB) a RRCConnectionReestablishmentRequest message. However, in step 7, the NW (via a BS) sends a RRCConnectionReestablishmentReject message because the UE context is not available in Cell 2. In step 8, the UE goes to RRC_IDLE.

Thus, because the UE could not determine that Cell 2 did not have the UE context available (or that Cell 3 did have the UE context available), the UE selected Cell 2 based on RSRP levels between Cell 2 and Cell 3, even though Cell 3 had a suitable RSRP level and had the UE context available.

Because the details of the cell selection algorithm and performance is left up to UE (and its internal modem) implementation, problems such as the one described above may occur. This means that it is up to modem suppliers and competition to provide the most efficient cell selection procedure for optimized performance.

Although this is beneficial for certain solutions, it also makes it difficult to predict the behavior of the UE and difficult (or perhaps even impossible) to perform network planning based on the assumed outcomes of cell selection procedures for a variety of UEs from different manufacturers.

Figure 3:
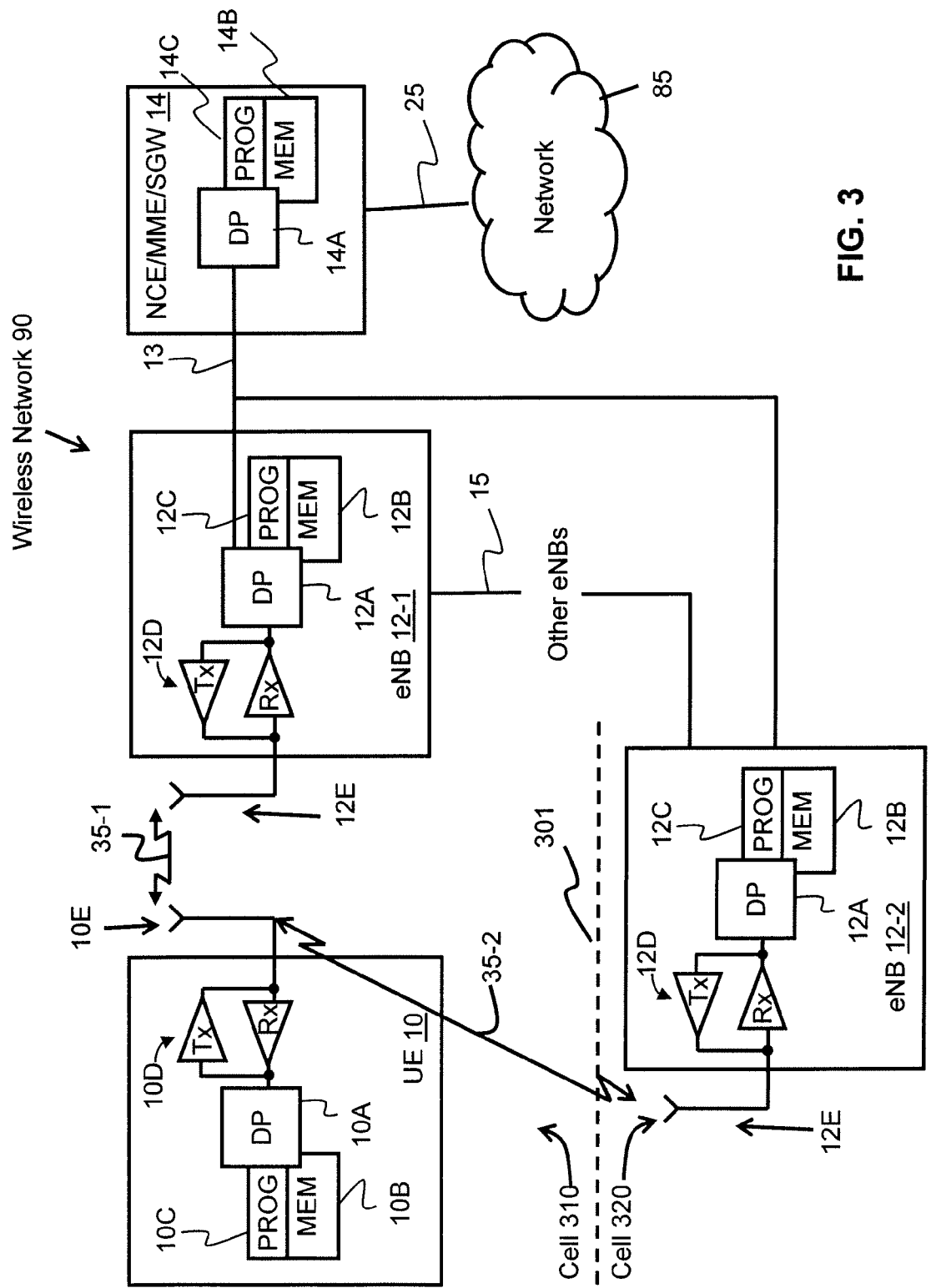
FIG. 3 shows a simplified block diagram of various electronic devices that are suitable for use in practicing the exemplary embodiments of this invention.

Before describing in further detail the exemplary embodiments of this invention, reference is made to FIG. 3 for illustrating a simplified block diagram of various electronic devices and apparatus that are suitable for use in practicing the exemplary embodiments of this invention. In FIG. 3, a wireless network 90 is adapted for communication over a wireless link 35-1 with an apparatus, such as a mobile communication device which may be referred to as a UE 10, via a network access node, such as a Node B (base station), and more specifically an eNB 12. The network 90 may include a network control element (NCE) 14 that may include the MME/SGW functionality shown in FIG. 1, and which provides connectivity with a further network 85, such as a telephone network and/or a data communications network (e.g., the internet), via a link 25.

The eNB 12-1 forms cell 310 and the UE 10 is in a connected state (e.g., RRC_Connected) with the cell 310, its eNB 12-1, and the NW 90 via wireless link 35-1. The line 301 is used as a simple example to show the extant of the cells 310 and 320. Cell 320 is formed by the eNB 12-2 and is a neighbor cell to cell 310. The eNB 12-2 is connected to the NCE 14 in this example via link 13 and the eNB 12-2 is part of the wireless network 90. The eNB 12-2 may also be connected to a different NCE/MME from another part of the wireless network 90. The UE 10 may also be able to communicate with the eNB 12-2 via wireless link 35-2.

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas 10E. Each of the eNBs 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNBs 12 are coupled via a data/control path 13 to the NCE 14. The path 13 may be implemented as the S1 interface shown in FIG. 1. The eNBs 12 may also be coupled to other eNBs via data/control path 15, which may be implemented as the X2 interface shown in FIG. 1. The NCE 14 also includes a controller, such as at least one computer or a data processor (DP) 14A, and at least one computer-readable memory medium embodied as a memory (MEM) 14B that stores a program of computer instructions (PROG) 14C.

At least programs 10C and 12C are assumed to include program instructions that, when executed by the associated DP 10A, 12A, enables the corresponding UE 10, eNB 12 to operate in accordance with the exemplary embodiments of this invention, as will be discussed below in greater detail. The exemplary embodiments of this invention may be implemented at least in part by computer software executable by at least one of the data processors, or by hardware, or by a combination of software and hardware (and firmware).

In general, the various embodiments of the UE 10 can include, but are not limited to, cellular telephones, smartphones, personal digital assistants (PDAs) having wireless communication capabilities, tablets having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

In order to solve the exemplary problems discussed above, in an exemplary embodiment, the NW 90 (e.g., via eNB 12-1) would signal certain information (called "pre-configured redirection information" herein) to the UE before the UE experiences connection problems (here exemplified by RLF or HO failure, e.g., as a handover is attempted from cell 310 to cell 320) in the RRC_CONNECTED state. After the UE has experienced RLF or HO failure, the UE would then first attempt to camp on an indicated (and potentially suitable) cell (e.g., cell 320 and eNB 12-2) according to this signaled pre-configured redirection information.

Additionally, the NW 90 (e.g., via eNB 12-1) would indicate which of the cells (such as cell 320) have the UE context or only the cells having the UE context would be indicated (i.e., context availability is indirectly indicated). It is noted that the NW 90 is assumed to include one or more eNBs 12 that operate to carry out the operations indicated herein that are performed by the NW.

The exemplary embodiments of the instant invention could be utilized in systems other than E-UTRAN. However, in the following, the E-UTRAN connected state and an RLF situation are used as examples for exemplifying the concept.

The pre-configured redirection information could be signaled to the UE in dedicated signaling. The UE could use the information as follows:

1. The UE is in the RRC Connected state and has the pre-configured redirection information.
2. The UE experiences RLF (see 3GPP TS 36.300 and 3GPP TS 36.331 for details).
3. The UE starts searching the cells according to the pre-configured redirection information received and chooses the first found cell.
4. The UE initiates access procedure on the chosen cell. This is also outlined in more detail below.

The search of cells could be performed in the same order (i.e., priority) as the information is provided in the pre-configured redirection information or explicit priority information may be provided (e.g., Cell 1 has Priority 1; Cell 2 has Priority 2). Alternatively, when the UE has chosen the target cell (potentially among multiple target cells), the UE will first search for the target cell if the UE has not already detected the target cell. As another example, if the UE has not detected the target cell, the UE will search on an indicated frequency and especially for cell(s) (including the target cell) indicated by the NW. Alternatively, as another example, the UE will choose a cell among those detected according to the information provided in the pre-configured redirection information.

Figure 5:
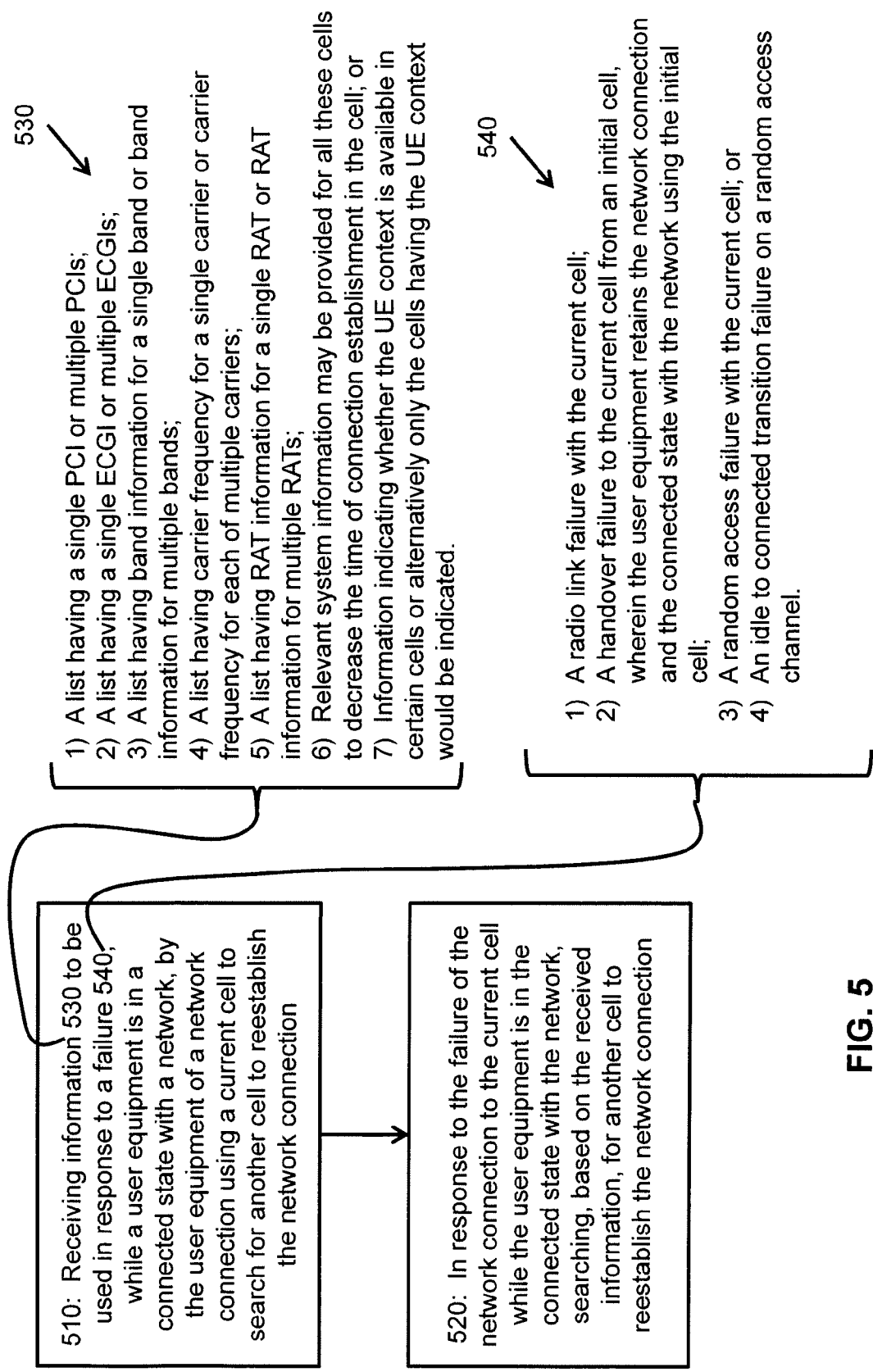
FIG. 5 is a block diagram of a flowchart performed by a user equipment for using pre-configured redirection information.

The pre-configured redirection information may include different levels of detail. The pre-configured redirection information could include, for example, some or all of the following information (information 530 as shown in FIG. 5):

1) A list having a single PCI or multiple PCIs;
2) A list having a single ECGI or multiple ECGIs;
3) A list having band information for a single band or band information for multiple bands;
4) A list having carrier frequency for a single carrier or carrier frequency for each of multiple carriers;
5) A list having RAT information for a single RAT or RAT information for multiple RATs;
6) Relevant system information may be provided for all these cells to decrease the time of connection establishment in the cell; or
7) Information indicating whether the UE context is available in certain cells or alternatively only the cells having the UE context would be indicated.

Optionally, only detected cells could be considered as re-direction candidates among the configured cells. It would be also beneficial if the measurements are activated on the carriers on which UE has redirection configuration.

Broadcasting of the list (e.g., one or more of the lists in 1)-5) above) should not be excluded, but it is unlikely that broadcasting of the list would be performed.

The instant invention should not be limited to RLF or HO failure. Exemplary embodiments could also be potentially used in other protocol error scenarios, e.g., random access failure. For random access failure, see 3GPP TS 36.321 (e.g., v.10.1.0, 2011-03), section 5.1.

The NW 90 (via one of the eNBs 12) can implement a variety of strategies as to how to distribute the UE information to candidate target cells in order to make the redirection work with potential re-establishment. For instance, there may be a concentration of RLFs occurring in some particular situation within the cell (varying between the cells). That is, although RLFs are more likely to happen in certain areas of a cell (e.g., cell edge), it does not mean that it is the same between different cells. One cell may also have a spot with poor coverage (or a coverage hole), e.g., due to a building or the like. There could be multiple of such concentrations also within the cell. The NW 90 may utilize the information (e.g., statistics about the radio conditions) from previous RLFs in order to assess the potential of a particular UE having a RLF. The earlier RLF information could then be used to identify to which cell(s) where the re-establishment would most likely happen. This would limit the signaling overhead both on the radio interface as well as in the network side.

An example of an exemplary cell selection for RRC connection re-establishment using dedicated signaling is shown in FIG. 4. FIG. 4 is an example based on FIG. 2. In step 1 of FIG. 4, the UE is in RRC_CONNECTED state on Cell 1. In step 2, the network includes pre-configured redirection information. Information regarding Cell 3 is present in the pre-configured redirection information. The message RRCConnectionReconfiguration is sent from the base station (BS) to the user equipment (UE). This message includes the PreConfiguredRedirectInfo including the pre-configured redirection information described above. This is an example message; that is, pre-configured redirection information could be signaled on some other message. In step 3, the UE confirms that the pre-configured redirection information is taken into use via a RRCConnectionReconfigurationtComplete message from the UE to the BS. Again, this message is merely exemplary and other messages might be used.

In step 4, Cell 2 and Cell 3 are available with sufficient RSRP levels. The RSRP level of Cell 2 is better than is the RSRP level of Cell 3. This is only one example of possible RSRP settings. In step 5, the RSRP level of Cell 1 suddenly goes bad and radio link failure occurs. In step 6, the UE 10 starts a cell selection procedure and the UE 10 searches Cell 3 first according to the pre-configured redirection information. In step 7, the UE 10 detects Cell 3 and starts a re-establishment procedure even if Cell 2 would have been heard as well. Cell 3 should also fulfill cell suitability criteria. The UE 10 sends to the BS 12 the RRCConnectionReestablishmentRequest message.

In step 8, The NW (e.g., BS 12) transmits to the UE 10 a RRCConnectionReestablishment message. In step 9, the UE transmits to the BS 12 a RRCConnectionReestablishmentComplete message. In step 10, connection is re-established and normal operation continues.

The following rules might be used by the UE, in an exemplary embodiment. The PreConfiguredRedirectInfo is the pre-configured redirection information described above.

After RLF or HO failure, the UE shall attempt to camp on a suitable cell according to PreConfiguredRedirectInfo, if available. If the UE cannot find a suitable cell, the UE is allowed to camp on any suitable cell of the indicated RAT. If PreConfiguredRedirectInfo is not available, the UE shall attempt to select a suitable cell on an EUTRA carrier. If no suitable cell is found according to the above, the UE shall perform a cell selection starting with a Stored Information Cell Selection procedure in order to find a suitable cell to camp on.

After RLF or HO failure after UE moved to RRC_CONNECTED state from camped on any cell state, the UE shall attempt to camp on an acceptable cell according to PreConfiguredRedirectInfo, if available. If the UE cannot find an acceptable cell, the UE is allowed to camp on any acceptable cell of the indicated RAT. If PreConfiguredRedirectInfo is not available, the UE shall attempt to select an acceptable cell on an EUTRA carrier. If no acceptable cell is found according to the above, the UE shall continue to search for an acceptable cell of any PLMN in state any cell selection.

Turning now to FIG. 5, a block diagram is shown of a flowchart performed by a user equipment for using pre-configured redirection information. The blocks in the flowchart may be performed by, e.g., PROG 10C executed by DP 10A, which causes the UE 10 to perform these operations. Additionally, the blocks may be performed by hardware only, such as a very large scale integrated circuit specifically designed to perform these operations. Additionally, the blocks may be performed by some combination of software (executed by hardware) and by hardware. In block 510, the user equipment performs the operation of receiving information 530 (described above also) to be used in response to a failure, while a user equipment is in a connected state with a network, by the user equipment of a network connection using a current cell to search for another cell to reestablish the network connection. The information 530 may be any one or more of the following non-limiting examples:

1) A list having a single PCI or multiple PCIs;
2) A list having a single ECGI or multiple ECGIs;
3) A list having band information for a single band or band information for multiple bands;
4) A list having carrier frequency for a single carrier or carrier frequency for each of multiple carriers;
5) A list having RAT information for a single RAT or RAT information for multiple RATs;
6) Relevant system information may be provided for all these cells to decrease the time of connection establishment in the cell; or
7) Information indicating whether the UE context is available in certain cells or alternatively only the cells having the UE context would be indicated.

The failure 540 of the network connection to the current cell could be any of the following (as non-limiting examples):

1) A radio link failure with the current cell;
2) A handover failure to the current cell from an initial cell, wherein the user equipment retains the network connection and the connected state with the network using the initial cell;
3) A random access failure with the current cell; or
4) An idle to connected transition failure on a random access channel.

In block 520, the user equipment performs the operation of, in response to the failure 540 of the network connection to the current cell while the user equipment is in the connected state with the network, searching, based on the received information 530, for another cell to reestablish the network connection.

Figure 6:
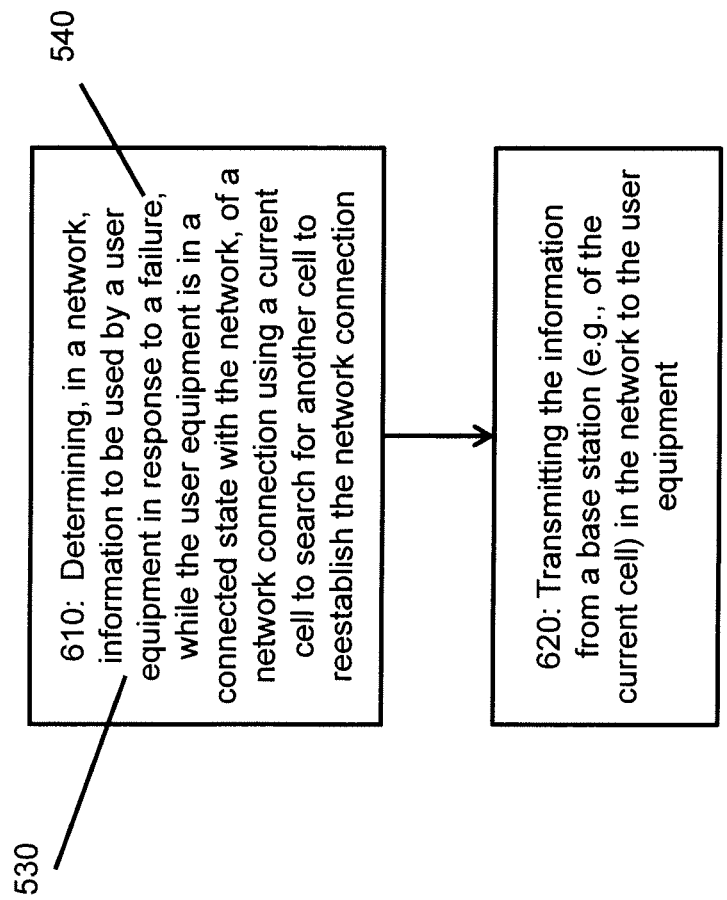
FIG. 6 is a block diagram of a flowchart performed by a network (e.g., base station) for using pre-configured redirection information.

Turning now to FIG. 6, a block diagram is shown of a flowchart performed by a network (e.g., base station) for using pre-configured redirection information. The blocks in the flowchart may be performed by, e.g., PROG 12C executed by DP 12A, which causes the eNB 12 to perform these operations. Additionally, the blocks may be performed by hardware only, such as a very large scale integrated circuit specifically designed to perform these operations. Additionally, the blocks may be performed by some combination of software (executed by hardware) and by hardware. In block 610, the network performs the operation of determining, in the network, information 530 to be used by a user equipment in response to a failure 540, while the user equipment is in a connected state with the network, of a network connection using a current cell to search for another cell to reestablish the network connection.

In block 620, the network (e.g., base station such as eNB 12) performs the operation of transmitting indications of the information from a base station (e.g., of the current cell) in the network to the user equipment. In the exemplary scenarios 1, 3, and 4 of failures 540, the current cell would transmit the indications, e.g., sometime prior to the failure 540. However, in scenario 2 of failures 540, there is a handover failure from an initial cell to the current cell. In this scenario, typically the initial cell would perform the operation of transmitting the indications, e.g., prior to the handover failure.

In an exemplary embodiment, (Item 1) a method comprises: receiving information to be used in response to a failure, while a user equipment is in a connected state with a network, by the user equipment of a network connection using a current cell to search for another cell to reestablish the network connection; and in response to the failure of the network connection to the current cell while the user equipment is in the connected state with the network, searching, based on the received information, for another cell to reestablish the network connection.

Item 2. The method of item 1, wherein the information comprises a list comprising one or more physical cell identities, and wherein searching further comprises searching for another cell meeting one of the one or more physical cell identities to reestablish the network connection.

Item 3. The method of item 1, wherein the information comprises a list comprising one or more enhanced cell global identities, and wherein searching further comprises searching for another cell meeting one of the one or more enhanced cell global identities to reestablish the network connection.

Item 4. The method of item 1, wherein the information comprises a list comprising band information for one or more bands, and wherein searching further comprises searching for another cell meeting the band information in one of the one or more bands to reestablish the network connection.

Item 5. The method of item 1, wherein the information comprises a list comprising carrier frequency for each of one or more carriers, and wherein searching further comprises searching for another cell meeting the carrier frequency for one of the one or more carriers to reestablish the network connection.

Item 6. The method of item 1, wherein the information comprises radio access technology information for each of one or more radio access technologies, and wherein searching further comprises searching for another cell meeting the radio access technology information for one of the one or more radio access technologies to reestablish the network connection.

Item 7. The method of any one of item 2 to item 6, wherein: the information further comprises system information for each of one or more neighbor cells, the one or more neighbor cells neighboring the current cell, and receiving information further comprises receiving the system information for each of the one or more neighbor cells; the searching finds a selected one of the one or more neighbor cells as a cell to reestablish the network connection; and the method further comprises establishing a connection to the selected neighbor cell by using the system information corresponding to the selected neighbor cell.

Item 8. The method of any one of item 2 to item 6, wherein the list comprises a plurality of entities and wherein each of two or more of the plurality of entities is associated with a corresponding priority, and wherein searching further comprises searching for another cell in an order based on the priorities.

Item 9. The method of item 1, wherein the information comprises information indicating whether context of the user equipment is available in certain cells, and wherein searching further comprises searching the certain cells for another cell to reestablish the network connection.

Item 10. The method of any one of item 1 to item 9, wherein the failure by the user equipment of the network connection using the current cell comprises a radio link failure with the current cell.

Item 11. The method of any one of item 1 to item 9, wherein the failure by the user equipment of the network connection using the current cell comprises a handover failure to the current cell from an initial cell, and wherein the user equipment retains the network connection and the connected state with the network using the initial cell.

Item 12. The method of any one of item 1 to item 9, wherein the failure by the user equipment of the network connection using the current cell comprises a random access failure with the current cell.

Item 13. The method of any one of item 1 to item 9, wherein the failure by the user equipment of the network connection using the current cell comprises an idle to connected transition failure on a random access channel.

Item 14. The method of any one of item 1 to item 13, wherein the connected state is an RRC_CONNECTED state.

Also disclosed is an exemplary apparatus comprising one or more processors and one or more memories including computer program code, the one or more memories and the computer program code configured to, with the one or more processors, cause the apparatus to perform any of the operations in the method of any one of the items 1 to 14. For instance, an exemplary apparatus comprises one or more processors and one or more memories including computer program code, the one or more memories and the computer program code configured to, with the one or more processors, cause the apparatus to perform: receiving information to be used in response to a failure, while a user equipment is in a connected state with a network, by the user equipment of a network connection using a current cell to search for another cell to reestablish the network connection; and in response to the failure of the network connection to the current cell while the user equipment is in the connected state with the network, searching, based on the received information, for another cell to reestablish the network connection.

Further disclosed is a computer program product comprising a computer-readable medium bearing computer program code embodied therein for use with a computer, the computer program code comprising code for performing any of the operations in the method of any one of the items 1 to 14. For example, a computer program product comprises a computer-readable medium bearing computer program code embodied therein for use with a computer, the computer program code comprising: code for receiving information to be used in response to a failure, while a user equipment is in a connected state with a network, by the user equipment of a network connection using a current cell to search for another cell to reestablish the network connection; and code for, in response to the failure of the network connection to the current cell while the user equipment is in the connected state with the network, searching, based on the received information, for another cell to reestablish the network connection.

Additionally, an apparatus is disclosed that comprises means for performing any of the operations in the method of any one of the items 1 to 14. For instance, an apparatus comprises means for receiving information to be used in response to a failure, while a user equipment is in a connected state with a network, by the user equipment of a network connection using a current cell to search for another cell to reestablish the network connection; and means, in response to the failure of the network connection to the current cell while the user equipment is in the connected state with the network, for searching, based on the received information, for another cell to reestablish the network connection.

In another exemplary embodiment, (Item 15) a method is disclosed that comprises: determining, in a network, information to be used by a user equipment in response to a failure, while the user equipment is in a connected state with the network, of a network connection using a current cell to search for another cell to reestablish the network connection; and transmitting the information from a base station (e.g., of the current cell) in the network to the user equipment.

Item 16. The method of item 15, wherein the information comprises a list comprising one or more physical cell identities.

Item 17. The method of item 15, wherein the information comprises a list comprising one or more enhanced cell global identities.

Item 18. The method of item 15, wherein the information comprises a list comprising band information for one or more bands.

Item 19. The method of item 15, wherein the information comprises a list comprising carrier frequency for each of one or more carriers.

Item 20. The method of item 15, wherein the information comprises radio access technology information for each of one or more radio access technologies.

Item 21. The method of any one of items 17 to 20, wherein: the information further comprises system information for each of one or more neighbor cells, the one or more neighbor cells neighboring the current cell, the system information to be used by the user equipment to establish a connection to a neighbor cell selected by the user equipment; and transmitting further comprises transmitting from the base station to the user equipment the system information for each of the one or more neighbor cells.

Item 22. The method of any one of items 16 to 20, wherein the list comprises a plurality of entities and wherein each of two or more of the plurality of entities is associated with a corresponding priority.

Item 23. The method of item 15, wherein the information comprises information indicating whether context of the user equipment is available in certain cells, and wherein searching further comprises searching the certain cells for another cell to reestablish the network connection.

Item 24. The method of item 15, wherein the information further comprises information for each of one or more neighbor cells, the one or more neighbor cells neighboring the current cell, the one or more neighbor cells limited to those cells having suitable context for the user equipment.

Item 25. The method of any one of items 15 to 24, wherein the failure by the user equipment of the network connection using the current cell comprises a radio link failure with the current cell.

Item 26. The method of any one of items 15 to 24, wherein the failure by the user equipment of the network connection using the current cell comprises a handover failure to a current cell from an initial cell, and wherein the user equipment retains the network connection and the connected state with the network using the initial cell.

Item 27. The method of any one of items 15 to 24, wherein the failure by the user equipment of the network connection using the current cell comprises a random access failure to a current cell.

Item 28. The method of any one of items 15 to 24, wherein the failure by the user equipment of the network connection using the current cell comprises an idle to connected transition failure on a random access channel.

Item 29. The method of any one of items 15 to 28, wherein the connected state is an RRC_CONNECTED state.

Also disclosed is an exemplary apparatus comprising one or more processors and one or more memories including computer program code, the one or more memories and the computer program code configured to, with the one or more processors, cause the apparatus to perform any of the operations in the method of any one of the items 15 to 29. For instance, an exemplary apparatus comprises one or more processors and one or more memories including computer program code, the one or more memories and the computer program code configured to, with the one or more processors, cause the apparatus to perform: determining, in a network, information to be used by a user equipment in response to a failure, while the user equipment is in a connected state with the network, of a network connection using a current cell to search for another cell to reestablish the network connection; and transmitting the information from a base station of the current cell in the network to the user equipment.

Further disclosed is a computer program product comprising a computer-readable medium bearing computer program code embodied therein for use with a computer, the computer program code comprising code for performing any of the operations in the method of any one of the items 15 to 29. For example, a computer program product comprises a computer-readable medium bearing computer program code embodied therein for use with a computer, the computer program code comprising: code for determining, in a network, information to be used by a user equipment in response to a failure, while the user equipment is in a connected state with the network, of a network connection using a current cell to search for another cell to reestablish the network connection; and code for transmitting the information from a base station of the current cell in the network to the user equipment.

Additionally, an apparatus is disclosed that comprises means for performing any of the operations in the method of any one of the items 15 to 29. For instance, an apparatus comprises means for determining, in a network, information to be used by a user equipment in response to a failure, while the user equipment is in a connected state with the network, of a network connection using a current cell to search for another cell to reestablish the network connection; and means for transmitting the information from a base station of the current cell in the network to the user equipment.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out above, other aspects of the invention comprise other combinations of features from the described embodiments and the claims, and not solely the combinations explicitly set out above or in the claims.

It is also noted herein that while the above describes example embodiments of the invention, these descriptions should not be viewed in a limiting sense. Rather, there are several variations and modifications which may be made without departing from the scope of the instant invention.

What is claimed is:

1. A method, comprising:
   receiving information to be used in response to a failure, while a user equipment is in a connected state with a network, of a network connection between the user equipment and a current cell, the received information to be used by the user equipment to search for another cell to reestablish the network connection; and
   in response to the failure of the network connection to the current cell while the user equipment is in the connected state with the network, searching, based on the received information, for another cell to reestablish the network connection,
   wherein the information comprises at least one of:
   information indicating whether context of the user equipment is available in certain cells, and wherein searching further comprises searching the certain cells for another cell to reestablish the network connection; and
   information for each of one or more indicated cells, the one or more indicated cells limited to those cells having suitable context for the user equipment, and wherein the searching further comprises searching the indicated cells to reestablish the network connection, wherein the information further comprises one or more of the following:
      a list comprising one or more physical cell identities, and wherein searching further comprises searching for another cell meeting one of the one or more physical cell identities to reestablish the network connection;
      a list comprising one or more enhanced cell global identities, and wherein searching further comprises searching for another cell meeting one of the one or more enhanced cell global identities to reestablish the network connection;
      a list comprising band information for one or more bands, and wherein searching further comprises searching for another cell meeting the band information in one of the one or more bands to reestablish the network connection; and
      a list comprising carrier frequency for each of one or more carriers, and wherein searching further comprises searching for another cell meeting the carrier frequency for one of the one or more carriers to reestablish the network connection,
   wherein the failure by the user equipment of the network connection using the current cell comprises one of:
   a radio link failure with the current cell;
   a handover failure to the current cell from an initial cell, and wherein the user equipment retains the network connection and the connected state with the network using the initial cell;
   a random access failure with the current cell; and
   an idle to connected transition failure on a random access channel.

2. The method of claim 1, wherein the information comprises radio access technology information for each of one or more radio access technologies, and wherein searching further comprises searching for another cell meeting the radio access technology information for one of the one or more radio access technologies to reestablish the network connection.

3. The method of claim 1, wherein:
   the information further comprises system information for each of one or more other cells and receiving information further comprises receiving the system information for each of the one or more other cells;
   the searching finds a selected one of the one or more other cells as a cell to reestablish the network connection; and
   the method further comprises establishing a connection to the selected other cell by using the system information corresponding to the selected other cell.

4. The method of claim 1, wherein the connected state is an RRC_CONNECTED state.

5. An apparatus, comprising:
   one or more processors; and
   one or more memories including computer program code,
   the one or more memories and the computer program code configured, with the one or more processors, to cause the apparatus to perform at least the following:
      receiving information to be used in response to a failure, while a user equipment is in a connected state with a network, of a network connection between the user equipment and a current cell, the received information to be used by the user equipment to search for another cell to reestablish the network connection; and
      in response to the failure of the network connection to the current cell while the user equipment is in the connected state with the network, searching, based on the received information, for another cell to reestablish the network connection,
   wherein the information comprises at least one of:
      information indicating whether context of the user equipment is available in certain cells, and wherein searching further comprises searching the certain cells for another cell to reestablish the network connection; and information for each of one or more indicated cells, the
one or more indicated cells limited to those cells
having suitable context for the user equipment, and
wherein the searching further comprises searching
the indicated cells to reestablish the network connection, wherein the information further comprises one or more of
the following:
- a list comprising one or more physical cell identities,
and wherein searching further comprises searching
for another cell meeting one of the one or more
physical cell identities to reestablish the network
connection;
- a list comprising one or more enhanced cell global
identities, and wherein searching further comprises
searching for another cell meeting one of the one or
more enhanced cell global identities to reestablish
the network connection;
- a list comprising band information for one or more
bands, and wherein searching further comprises
searching for another cell meeting the band information in one of the one or more bands to reestablish
the network connection; and
- a list comprising carrier frequency for each of one or
more carriers, and wherein searching further comprises searching for another cell meeting the carrier
frequency for one of the one or more carriers to
reestablish the network connection, wherein the failure by the user equipment of the network
connection using the current cell comprises one of:
- a radio link failure with the current cell;
- a handover failure to the current cell from an initial cell,
and wherein the user equipment retains the network
connection and the connected state with the network
using the initial cell;
- a random access failure with the current cell; and
- an idle to connected transition failure on a random
access channel.

6. A method, comprising:
determining, in a network, information to be used by a
user equipment in response to a failure of a network
connection between the user equipment and a current
cell, the information to be used by the user equipment
in response to the failure occurring while the user
equipment is in a connected state with the network and
to be used to search for another cell to reestablish the
network connection, wherein the information comprises at least one of: information indicating whether
context of the user equipment is available in certain
cells, and information for each of one or more indicated
cells, the one or more indicated cells limited to those
cells having suitable context for the user equipment;
and
transmitting the information from the network to the user
equipment,
wherein the information further comprises one or more of
the following:
a list comprising one or more physical cell identities;
a list comprising one or more enhanced cell global
identities;
a list comprising band information for one or more bands;
and
a list comprising carrier frequency for each of one or more
carriers, wherein the failure by the user equipment of the network
connection using the current cell comprises one of:
a radio link failure with the current cell;
a handover failure to the current cell from an initial cell,
and wherein the user equipment retains the network
connection and the connected state with the network
using the initial cell;
a random access failure with the current cell; and
an idle to connected transition failure on a random access
channel.

7. The method of claim 6, wherein the information
comprises radio access technology information for each of
one or more radio access technologies.

8. The method of claim 6, wherein:
the information further comprises system information for
each of one or more other cells, the system information
to be used by the user equipment to establish a connection to one of the one or more other cells selected by
the user equipment; and
transmitting further comprises transmitting from the base
station to the user equipment the system information
for each of the one or more other cells.

9. A computer program, embodied on a non-transitory
computer readable storage medium, the computer program
configured to control a processor to perform operations,
comprising:
receiving information to be used in response to a failure,
while a user equipment is in a connected state with a
network, of a network connection between the user
equipment and a current cell, the received information
to be used by the user equipment to search for another
cell to reestablish the network connection; and
in response to the failure of the network connection to the
current cell while the user equipment is in the connected state with the network, searching, based on the
received information, for another cell to reestablish the
network connection,
wherein the information comprises at least one of:
information indicating whether context of the user equipment is available in certain cells, and wherein searching
further comprises searching the certain cells for another
cell to reestablish the network connection; and
information for each of one or more indicated cells, the
one or more indicated cells limited to those cells having
suitable context for the user equipment, and wherein
the searching further comprises searching the indicated
cells to reestablish the network connection,
wherein the information further comprises one or more of
the following:
a list comprising one or more physical cell identities, and
wherein searching further comprises searching for
another cell meeting one of the one or more physical
cell identities to reestablish the network connection;
a list comprising one or more enhanced cell global
identities, and wherein searching further comprises
searching for another cell meeting one of the one or
more enhanced cell global identities to reestablish the
network connection;
a list comprising band information for one or more bands,
and wherein searching further comprises searching for
another cell meeting the band information in one of the
one or more bands to reestablish the network connection; and
a list comprising carrier frequency for each of one or more
carriers, and wherein searching further comprises searching for another cell meeting the carrier frequency for one of the one or more carriers to reestablish the network connection, wherein the failure by the user equipment of the network connection using the current cell comprises one of:

a radio link failure with the current cell;

a handover failure to the current cell from an initial cell, and wherein the user equipment retains the network connection and the connected state with the network using the initial cell;

a random access failure with the current cell; and an idle to connected transition failure on a random access channel.

10. An apparatus, comprising:

one or more processors; and one or more memories including computer program code, the one or more memories and the computer program code configured, with the one or more processors, to cause the apparatus to perform at least the following:

determining, in a network, information to be used by a user equipment in response to a failure of a network connection between the user equipment and a current cell, the information to be used by the user equipment in response to the failure occurring while the user equipment is in a connected state with the network and to be used to search for another cell to reestablish the network connection, wherein the information comprises at least one of: information indicating whether context of the user equipment is available in certain cells, and information for each of one or more indicated cells, the one or more indicated cells limited to those cells having suitable context for the user equipment; and transmitting the information from the network to the user equipment, wherein the information further comprises one or more of the following:

a list comprising one or more physical cell identities;

a list comprising one or more enhanced cell global identities;

a list comprising band information for one or more bands; and a list comprising carrier frequency for each of one or more carriers, wherein the failure by the user equipment of the network connection using the current cell comprises one of:

a radio link failure with the current cell;

a handover failure to the current cell from an initial cell, and wherein the user equipment retains the network connection and the connected state with the network using the initial cell;

a random access failure with the current cell; and an idle to connected transition failure on a random access channel.

11. The apparatus of claim 5, wherein the information comprises radio access technology information for each of one or more radio access technologies, and wherein searching further comprises searching for another cell meeting the radio access technology information for one of the one or more radio access technologies to reestablish the network connection.

12. The apparatus of claim 5, wherein:

the information further comprises system information for each of one or more other cells and receiving information further comprises receiving the system information for each of the one or more other cells;

the searching finds a selected one of the one or more other cells as a cell to reestablish the network connection; and the method further comprises establishing a connection to the selected other cell by using the system information corresponding to the selected other cell.

13. The method of claim 1, wherein the list comprises a plurality of entities and wherein each of two or more of the plurality of entities is associated with a corresponding priority, and wherein searching further comprises searching for another cell in an order based on priorities of the two or more entities.

14. The apparatus of claim 5, wherein the list comprises a plurality of entities and wherein each of two or more of the plurality of entities is associated with a corresponding priority, and wherein searching further comprises searching for another cell in an order based on priorities of the two or more entities.

15. The method of claim 6, wherein the list comprises a plurality of entities and wherein each of two or more of the plurality of entities is associated with a corresponding priority.

16. The computer program of claim 9, wherein the list comprises a plurality of entities and wherein each of two or more of the plurality of entities is associated with a corresponding priority, and wherein searching further comprises searching for another cell in an order based on priorities of the two or more entities.

17. The apparatus of claim 10, wherein the list comprises a plurality of entities and wherein each of two or more of the plurality of entities is associated with a corresponding priority.

* * * * *